United States Patent
Schmidt

(10) Patent No.: US 9,997,160 B2
(45) Date of Patent: Jun. 12, 2018

(54) SYSTEMS AND METHODS FOR DYNAMIC DOWNLOAD OF EMBEDDED VOICE COMPONENTS

(71) Applicant: Toyota Motor Engineering & Manufacturing North America, Inc., Erlanger, KY (US)

(72) Inventor: Eric Randell Schmidt, Northville, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 453 days.

(21) Appl. No.: 13/932,241

(22) Filed: Jul. 1, 2013

(65) Prior Publication Data
US 2015/0006182 A1    Jan. 1, 2015

(51) Int. Cl.
*G10L 15/30*    (2013.01)
*G10L 15/22*    (2006.01)

(52) U.S. Cl.
CPC ........ *G10L 15/30* (2013.01); *G10L 2015/228* (2013.01)

(58) Field of Classification Search
CPC ....... G10L 15/06; G10L 15/18; G10L 15/183; G10L 2015/233; G10L 15/30; G10L 2015/223; G10L 2015/228
USPC .... 704/231, 243, 244, 251, 255, 270, 270.1, 704/275
See application file for complete search history.

(56) References Cited

U.S. PATENT DOCUMENTS

| | | | |
|---|---|---|---|
| 5,425,128 A * | 6/1995 | Morrison | 704/243 |
| 6,233,559 B1 * | 5/2001 | Balakrishnan | 704/275 |
| 6,408,272 B1 * | 6/2002 | White et al. | 704/270.1 |
| 7,076,362 B2 | 7/2006 | Ohtsuji et al. | |
| 7,386,455 B2 | 6/2008 | Kurganov et al. | |
| 7,505,910 B2 | 3/2009 | Kujirai | |
| 7,899,673 B2 | 3/2011 | Brown | |

(Continued)

FOREIGN PATENT DOCUMENTS

EP    2291987 B1    8/2012

OTHER PUBLICATIONS www.nuance.com/for-business/by-product/automotive-prduts-services/vocon-hybrid.htm, Vocon Hybrid Speech Recognition Software, 2013, Nuance, 4 pages.

*Primary Examiner* — Martin Lerner
(74) *Attorney, Agent, or Firm* — Dinsmore & Shohl LLP

(57) ABSTRACT

Systems and methods for dynamic download of embedded voice components are disclosed. One embodiment may be configured to receive an application via a wireless communication, where the application comprises a speech recognition component, receive the voice command from a user, and analyze the speech recognition component to determine a translation action to perform, based on the voice command. In some embodiments, in response to determining that the translation action includes downloading a vocabulary from a first remote computing device, the vocabulary may be downloaded from the first remote computing device to utilize the vocabulary to translate the voice command. In some embodiments, in response to determining that the translation action includes communicating the voice command to a second remote computing device, the voice command may be sent to the second remote computing device and receive a translated version of the voice command.

18 Claims, 6 Drawing Sheets

(56) References Cited

U.S. PATENT DOCUMENTS

| | | | |
|---|---|---|---|
| 7,904,300 B2 | 3/2011 | Abbott et al. | |
| 8,036,897 B2 | 10/2011 | Smolenski et al. | |
| 8,160,884 B2* | 4/2012 | Roth | G10L 15/183 704/270.1 |
| 8,296,383 B2 | 10/2012 | Lindahl | |
| 8,315,864 B2 | 11/2012 | Orcutt | |
| 8,731,939 B1* | 5/2014 | Lebeau et al. | 704/275 |
| 9,311,298 B2* | 4/2016 | Sarikaya | G10L 15/18 |
| 9,711,141 B2* | 7/2017 | Henton | G10L 15/22 |
| 2003/0144846 A1* | 7/2003 | Denenberg | 704/277 |
| 2007/0055529 A1* | 3/2007 | Kanevsky | G10L 15/1822 704/275 |
| 2008/0046250 A1 | 2/2008 | Agapi et al. | |
| 2009/0006100 A1* | 1/2009 | Badger | 704/275 |
| 2009/0271200 A1 | 10/2009 | Mishra et al. | |
| 2010/0185445 A1* | 7/2010 | Comerford | G10L 15/22 704/251 |
| 2011/0112827 A1* | 5/2011 | Kennewick | G10L 15/18 704/226 |
| 2012/0035931 A1* | 2/2012 | LeBeau et al. | 704/251 |
| 2012/0173237 A1 | 7/2012 | Dow et al. | |
| 2012/0184370 A1 | 7/2012 | Goller et al. | |
| 2012/0215543 A1 | 8/2012 | Oz et al. | |
| 2012/0265528 A1* | 10/2012 | Gruber | G10L 15/18 704/235 |
| 2013/0013319 A1* | 1/2013 | Grant | G10L 15/193 704/275 |
| 2013/0018658 A1 | 1/2013 | Agapi et al. | |
| 2013/0297293 A1* | 11/2013 | Di Cristo | G06F 17/279 704/9 |
| 2014/0074454 A1* | 3/2014 | Brown | G10L 15/08 704/235 |
| 2014/0379338 A1* | 12/2014 | Fry | G10L 15/19 704/246 |
| 2016/0004501 A1* | 1/2016 | Kar | G10L 15/22 704/234 |

* cited by examiner

SYSTEMS AND METHODS FOR DYNAMIC DOWNLOAD OF EMBEDDED VOICE COMPONENTS

TECHNICAL FIELD

Embodiments described herein generally relate to systems and methods for dynamic download of embedded voice components and, more specifically, to embodiments for facilitating download of voice commands and/or launch commands for newly installed applications.

BACKGROUND

Many vehicle users utilize a local speech recognition system to activate and/or operate aspects of a head unit and human-machine interface (HMI), such as in a vehicle or via a mobile phone. As an example, a vehicle user may oftentimes operate one or more functions of the vehicle via a voice command. As an example, the vehicle user may provide voice commands for routing the vehicle to a destination, commands for changing a radio station, etc. While these voice commands provide flexibility in hands free use of the vehicle and/or vehicle computing device, speech recognition is generally not available for applications installed into the vehicle computing device after production. Accordingly, these new applications cannot generally utilize voice command operation. Accordingly, a need exists for speech recognition launching and operation of applications installed after production of the speech recognition system.

SUMMARY

Systems and methods for dynamic download of embedded voice components are described. One embodiment of a method includes downloading an application, where the application includes a speech recognition component that includes a speech recognition instruction, and installing the application, where installing the application includes determining whether the speech recognition component includes a launch instruction and, in response to determining that the speech recognition component includes the launch instruction, install the launch instruction into an embedded speech recognition application. Some embodiments may be further configured for receiving a voice command from a user, determining a translation action to perform, based on the voice command and the speech recognition component, and determining whether the speech recognition component includes a first vocabulary. In response to determining that the speech recognition component includes the first vocabulary, embodiments are configured to utilize the first vocabulary to translate the voice command and perform a functional action that fulfills the voice command. Some embodiments may be further configured for determining whether the speech recognition component indicates that a second vocabulary from a different application will be utilized to translate the voice command, and utilizing the different application to translate the voice command.

In another embodiment, a system may be configured to receive an application that includes a speech recognition component via a wireless communication, receive the voice command from a user, and analyze the speech recognition component to determine a translation action to perform, based on the voice command. In some embodiments, in response to determining that the translation action includes downloading a vocabulary from a first remote computing device, the vocabulary may be downloaded from the first remote computing device to utilize the vocabulary to translate the voice command. In some embodiments, in response to determining that the translation action includes communicating the voice command to a second remote computing device, the voice command may be sent to the second remote computing device and receive a translated version of the voice command.

In yet another embodiment, a vehicle speech recognition system includes logic that causes a computing device to install an application, where the application includes a speech recognition component that includes a speech recognition instruction. The logic may also cause the computing device to receive a voice command from a user, and determine whether the speech recognition component includes a first vocabulary. In response to determining that the speech recognition component includes the first vocabulary, utilize the first vocabulary to translate the voice command and perform a functional action that fulfills the voice command. In some embodiments, the logic causes the computing device to determine whether the speech recognition component indicates that the voice command will be sent to a remote computing device and, in response to determining that the speech recognition component indicates that the voice command will be sent to the remote computing device for translation, send the voice command to the remote computing device, and receive the translated command. Some embodiments may perform the functional action that fulfills the voice command.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
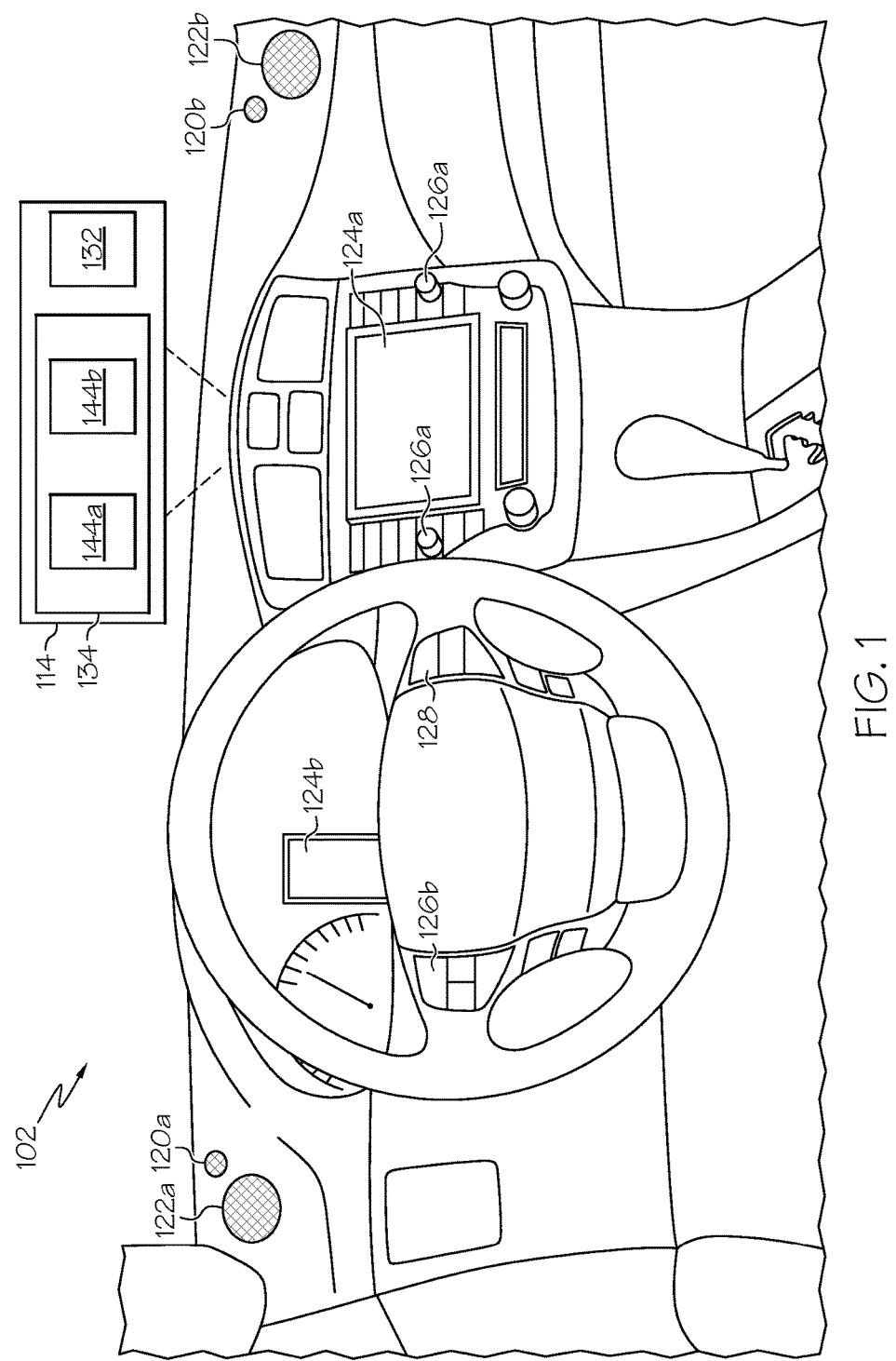
FIG. 1 schematically depicts an interior portion of a vehicle for providing speech recognition, according to embodiments disclosed herein.

Embodiments disclosed herein include systems and methods for dynamic download of embedded voice components. Specifically, embodiments may be configured to download new voice components, such as vocabularies and launch commands over-the-air for use in an embedded speech recognition system. These voice components may contain instructions that are similar to a traditional embedded speech recognition system.

These embodiments may be configured to differentiate among applications for using local speech recognition and/or remote speech recognition. As an example, a first application may be configured to identify one of three options. In such an application, the new vocabulary may be easily downloaded and stored. Thus, the first application may include instructions for downloading the vocabulary to the local speech recognition system. When a voice command is received in the first application, the local speech recognition system may operate as if the first application was included with the local speech recognition system at the time of production.

A second application may be downloaded that is configured for a user to make a selection from 20 million different options. Because the vocabulary required to voice-operate this second application may be impractical to download or store, the second application may include instructions for leveraging a remote speech recognition system, instead of instructions for downloading the vocabulary. Thus, the local device may receive a voice command; send the voice command to a remote speech recognition device; and receive a translation of the command from the remote speech recognition device. The local device may then execute the command.

Additionally, embodiments may be configured to communicate launch commands from a downloaded application for integration into an embedded local speech recognition system. As an example, if the user downloads a social media application, the social media application may also include phonetics for launching the application. Installation of the application will load the phonetics into the speech recognition system launch grammar. Thus, because any number of commands may be included, the user may provide commands such as "Social Media Places," "Social Media," "Social Networking," "I want to send a Social Media message," etc. to launch the application. Options may also be included for a user to add custom commands to launch the application.

Embodiments disclosed herein may also be configured to determine the intent and criteria of a voice command. If a user provides a voice command "route to Nat's Restaurant," the "route" portion of the command may be labeled as the intent. The "Nat's Restaurant" portion may be labeled as the criteria. If both the intent and the criteria are recognized, the local navigation system may determine the desired location as described above, and may provide said information to the vehicle user.

If the desired location is understood by the local speech recognition system but the location is not present in the local database, the system may (via a user command and/or automatically) access a remote computing device to determine the location and/or routing information to the desired destination. As an example, if the navigation system is unable to locate "Nat's Restaurant," an indication may be provided to the user, who may make a command such as "perform web search." The local navigation system may then access an internet (or other WAN) search engine to perform a search for the desired location. Upon finding the desired location, the navigation system may download or otherwise determine routing and/or location information for providing to the user.

If however, the intent is recognized from the voice command, but the criteria is not recognized, embodiments disclosed herein may send a data related to the voice command to a remote voice computing device that may include a more robust vocabulary to identify the criteria in the voice command. Upon acquiring the criteria from the remote voice computing device, a determination may be made regarding whether the location and/or routing are locally stored. If so, the information may be provided to the vehicle user. If not, the location may be searched via an internet (or other WAN) search engine, as discussed above.

Referring now to the drawings, FIG. 1 schematically depicts an interior portion of a vehicle 102 for providing speech recognition, according to embodiments disclosed herein. As illustrated, the vehicle 102 may include a number of components that may provide input to or output from the speech recognition systems described herein. The interior portion of the vehicle 102 includes a console display 124a and a dash display 124b (referred to independently and/or collectively herein as "display 124"). The console display 124a may provide one or more user interfaces and may be configured as a touch screen and/or include other features for receiving user input. The dash display 124b may similarly be configured to provide one or more interfaces, but often the data provided in the dash display 124b is a subset of the data provided by the console display 124a.

Regardless, at least a portion of the user interfaces depicted and described herein may be provided on either or both the console display 124a and the dash display 124b. The vehicle 102 also includes one or more microphones 120a, 120b (referred to independently and/or collectively herein as "microphone 120") and one or more speakers 122a, 122b (referred to independently and/or collectively herein as "speaker 122"). The microphone 120 may be configured for receiving user voice commands, audible user launch commands, and/or other inputs to the speech recognition systems described herein. Similarly, the speaker 122 may be utilized for providing audio content from the speech recognition system to the user. The microphone 120, the speaker 122, and/or related components may be part of an in-vehicle audio system and/or vehicle speech recognition system. The vehicle 102 also includes tactile input hardware 126a and/or peripheral tactile input 126b for receiving tactile user input, as will be described in further detail below. The vehicle 102 also includes an activation switch 128 for providing an activation input to the speech recognition system, as will also be described below.

Figure 2:
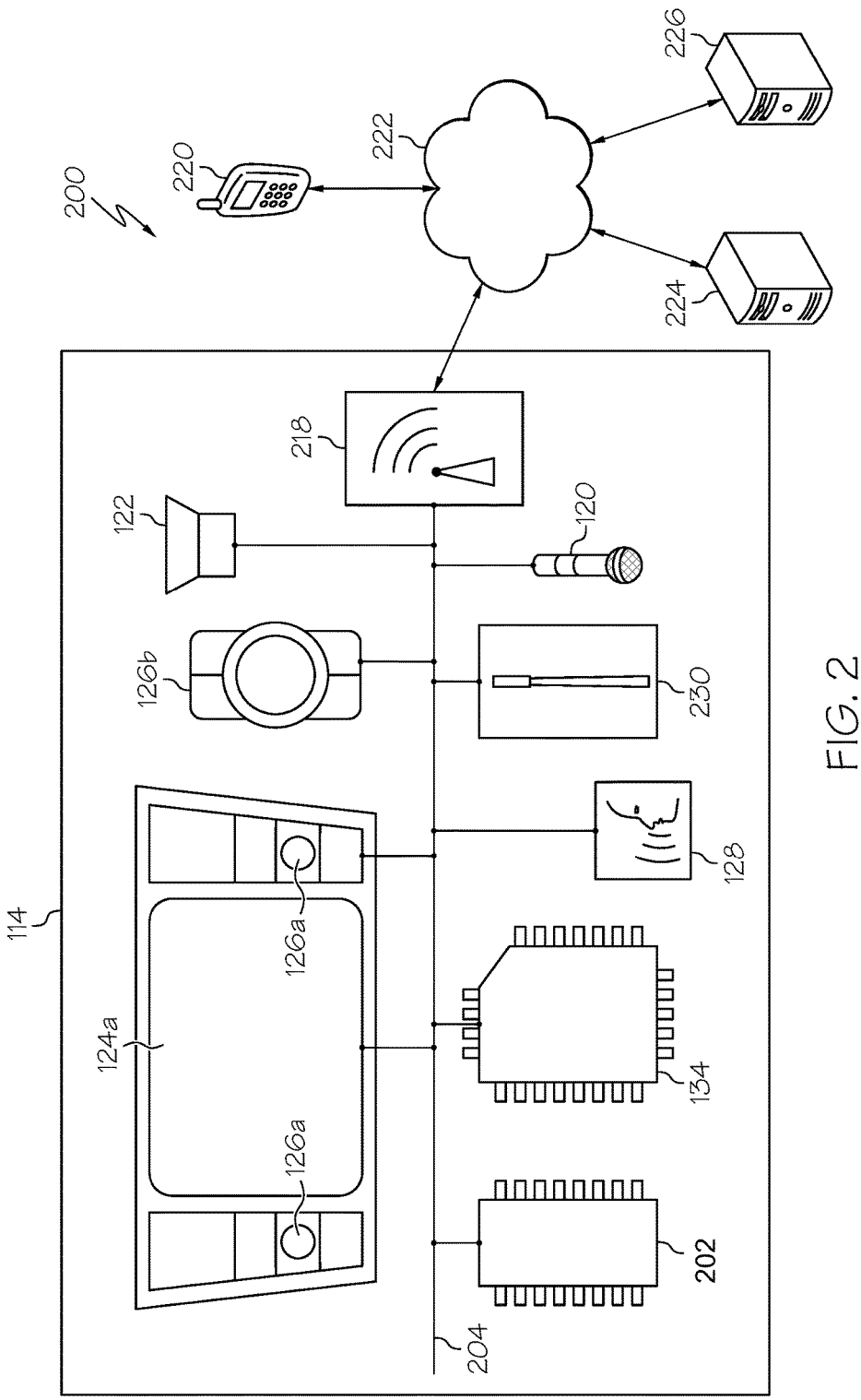
FIG. 2 schematically depicts an embodiment of a speech recognition system, according to embodiments disclosed herein.

Also illustrated in FIG. 1 is a vehicle computing device 114 that includes a memory component 134. Vehicle computing device 114 may include and/or facilitate operation of a vehicle speech recognition system (such as depicted in FIG. 2), a navigation system, and/or other components or systems described herein. The memory component 134 may include speech recognition logic 144a, applications logic 144b, and/or other logic for performing the described functionality. An operating system 132 may also be included and utilized for operation of the vehicle computing device 114.

FIG. 2 depicts an embodiment of a speech recognition system 200, according to embodiments described herein. It should be understood that one or more components of the vehicle computing device 114 may be integrated with the vehicle 102, as a part of a vehicle speech recognition system and/or may be embedded within a mobile device 220 (e.g., smart phone, laptop computer, etc.) carried by a driver of the vehicle 102. The vehicle computing device 114 includes one or more processors 202 ("processor 202"), a communication path 204, the memory component 134, a display 124, a speaker 122, tactile input hardware 126a, a peripheral tactile input 126b, a microphone 120, an activation switch 128, network interface hardware 218, and a satellite antenna 230.

The communication path 204 may be formed from any medium that is capable of transmitting a signal such as, for example, conductive wires, conductive traces, optical waveguides, or the like. Moreover, the communication path 204 may be formed from a combination of mediums capable of transmitting signals. In one embodiment, the communication path 204 includes a combination of conductive traces, conductive wires, connectors, and buses that cooperate to permit the transmission of electrical data signals to components such as processors, memories, sensors, input devices, output devices, and communication devices. Accordingly, the communication path 204 may be configured as a bus, such as for example a LIN bus, a CAN bus, a VAN bus, and the like. It is also noted that a signal may include a waveform (e.g., electrical, optical, magnetic, mechanical or electromagnetic), such as DC, AC, sinusoidal-wave, triangular-wave, square-wave, vibration, and the like, capable of traveling through a medium. The communication path 204 couples the various components of the vehicle computing device 114.

The processor 202 may be configured as a device capable of executing machine readable instructions, such as the speech recognition logic 144a, the applications logic 144b, and/or other logic as may be stored in the memory component 134. Accordingly, the processor 202 may be configured as a controller, an integrated circuit, a microchip, a computer, and/or any other computing device. The processor 202 is coupled to the other components of the vehicle computing device 114 via the communication path 204. Accordingly, the communication path 204 may couple any number of processors with one another and allow the modules coupled to the communication path 204 to operate in a distributed computing environment. Specifically, each of the modules may operate as a node that may send and/or receive data.

The memory component 134 may be configured as any type of integrated or peripheral non-transitory computer readable medium, such as RAM, ROM, flash memories, hard drives, and/or any device capable of storing machine readable instructions such that the machine readable instructions can be accessed and executed by the processor 202. The machine readable instructions may include logic and/or algorithms (such as the speech recognition logic 144a, the applications logic 144b, and/or other pieces of logic) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the memory component 134. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the speech recognition logic 144a may be configured as an embedded speech recognition application and may include one or more speech recognition algorithms, such as an automatic speech recognition engine that processes voice commands and/or audible user launch commands received from the microphone 120 and/or extracts speech information from such commands, as is described in further detail below. Further, the speech recognition logic 144a may include machine readable instructions that, when executed by the processor 202, cause the speech recognition to perform the actions described herein.

Specifically, the speech recognition logic 144a may be configured to integrate with one or more of the applications that are collectively referred to as the applications logic 144b. Thus, the speech recognition logic 144a can facilitate launching an application via an audible user launch command and/or for operating the application via voice commands. The applications logic 144b may include any other application with which a user may interact, such as a navigation application, calendar application, etc., as described in more detail below. While the applications logic 144b is depicted as a single piece of logic, this is merely an example. In some embodiments, the applications logic 144b may include a plurality of different applications, each with its own stored launch commands and/or operational commands.

Accordingly, the speech recognition logic 144a may be configured to store and/or access the stored launch commands of the applications that were installed into the vehicle computing device 114 during manufacture. However, embodiments disclosed herein are also configured to facilitate communication of launch commands from newly installed applications, such that the speech recognition logic 144a may cause the vehicle computing device 114 to launch the new applications via an audible user launch command.

The display 124 may be configured as a visual output such as for displaying information, entertainment, maps, navigation, information, or a combination thereof. The display 124 may include any medium capable of displaying a visual output such as, for example, a cathode ray tube, light emitting diodes, a liquid crystal display, a plasma display, or the like. Moreover, the display 124 may be configured as a touchscreen that, in addition to providing visual information, detects the presence and location of a tactile input upon a surface of or adjacent to the display. It is also noted that the display 124 can include a processor and/or memory component for providing this functionality. With that said, some embodiments may not include a display 124 in other embodiments, such as embodiments in which the speech recognition system 200 audibly provides outback or feedback via the speaker 122.

The speaker 122 may be configured for transforming data signals from the vehicle computing device 114 into audio signals, such as in order to output audible prompts or audible information from the speech recognition system 200. The speaker 122 is coupled to the processor 202 via the communication path 204. However, it should be understood that in other embodiments the speech recognition system 200 may not include the speaker 122, such as in embodiments in which the speech recognition system 200 does not output audible prompts or audible information, but instead visually provides output via the display 124.

Still referring to FIG. 2, the tactile input hardware 126a may include any device or component for transforming mechanical, optical, and/or electrical signals into a data signal capable of being transmitted with the communication path 204. Specifically, the tactile input hardware 126a may include any number of movable objects that each transform physical motion into a data signal that can be transmitted over the communication path 204 such as, for example, a button, a switch, a knob, a microphone or the like. In some embodiments, the display 124 and the tactile input hardware 126a are combined as a single module and operate as an audio head unit, information system, and/or entertainment system. However, it is noted that the display 124 and the tactile input hardware 126a may be separate from one another and operate as a single module by exchanging signals via the communication path 204. While the vehicle computing device 114 includes tactile input hardware 126a in the embodiment depicted in FIG. 2, the vehicle computing device 114 may not include tactile input hardware 126a in other embodiments, such as embodiments that do not include the display 124.

The peripheral tactile input 126b may be coupled to other modules of the vehicle computing device 114 via the communication path 204. In one embodiment, the peripheral tactile input 126b is located in a vehicle console to provide an additional location for receiving input. The peripheral tactile input 126b operates in a manner substantially similar to the tactile input hardware 126a.

The microphone 120 may be configured for transforming acoustic vibrations received by the microphone into a speech input signal. The microphone 120 is coupled to the processor 202, which may process the speech input signals received from the microphone 120 and/or extract speech information from such signals. Similarly, the activation switch 128 may be configured for activating or interacting with the vehicle computing device. In some embodiments, the activation switch 128 is an electrical switch that generates an activation signal when depressed, such as when the activation switch 128 is depressed by a user when the user desires to utilize or interact with the vehicle computing device.

As noted above, the vehicle computing device 114 includes the network interface hardware 218 for transmitting and/or receiving data via a wireless network. Accordingly, the network interface hardware 218 can include a communication transceiver for sending and/or receiving data according to any wireless communication standard. For example, the network interface hardware 218 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, and/or the like. In some embodiments, the network interface hardware 218 includes a Bluetooth transceiver that enables the speech recognition system 200 to exchange information with the mobile device 220 via Bluetooth communication.

Still referring to FIG. 2, data from applications running on the mobile device 220 may be provided from the mobile device 220 to the vehicle computing device 114 via the network interface hardware 218. The mobile device 220 may include any device having hardware (e.g., chipsets, processors, memory, etc.) for coupling with the network interface hardware 218 and a network 222. Specifically, the mobile device 220 may include an antenna for communicating over one or more of the wireless computer networks described above. Moreover, the mobile device 220 may include a mobile antenna for communicating with the network 222. Accordingly, the mobile antenna may be configured to send and receive data according to a mobile telecommunication standard of any generation (e.g., 1G, 2G, 3G, 4G, 5G, etc.). Specific examples of the mobile device 220 include, but are not limited to, smart phones, tablet devices, e-readers, laptop computers, or the like.

The network 222 generally includes a wide area network, such as the internet, a cellular network, PSTN etc. and/or local area network for facilitating communication among computing devices. The network 222 may be wired and/or wireless and may operate utilizing one or more different telecommunication standards. Accordingly, the network 222 can be utilized as a wireless access point by the mobile device 220 to access one or more remote computing devices (e.g., a first remote computing device 224 and/or a second remote computing device 226). The first remote computing device 224 and the second remote computing device 226 generally include processors, memory, and chipset for delivering resources via the network 222. Resources can provide, for example, processing, storage, software, and information from the first remote computing device 224 and/or the second remote computing device 226 to the vehicle computing device 114 via the network 222. It is also noted that the first remote computing device 224 and/or the second remote computing device 226 can share resources with one another over the network 222 such as, for example, via the wired portion of the network, the wireless portion of the network, or combinations thereof.

The remote computing devices 224, 226 may be configured as third party servers that provide additional speech recognition capability. For example, one or more of the remote computing devices 224, 226 may include speech recognition algorithms capable of recognizing more words than the local speech recognition algorithms stored in the memory component 134. Similarly, one or more of the remote computing devices 224, 226 may be configured for providing a wide area network search engine for locating information as described herein. Other functionalities of the remote computing devices 224, 226 are described in more detail below.

The satellite antenna 230 is also included and is configured to receive signals from navigation system satellites. In some embodiments, the satellite antenna 230 includes one or more conductive elements that interact with electromagnetic signals transmitted by navigation system satellites. The received signal may be utilized to calculate the location (e.g., latitude and longitude) of the satellite antenna 230 or an object positioned near the satellite antenna 230, by the processor 202.

Figure 3:
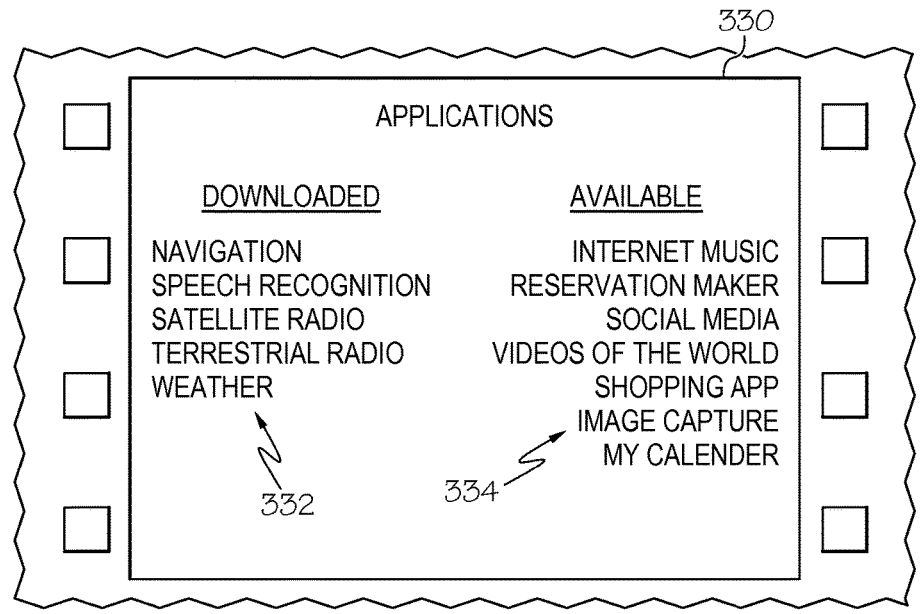
FIG. 3 schematically depicts a user interface that provides a listing of applications that are available to the vehicle computing device, according to embodiments described herein.

FIG. 3 depicts a user interface 330 that provides a listing of applications that are available to the vehicle computing device 114, according to embodiments described herein. As discussed above, the vehicle computing device 114 may store the speech recognition logic 144a that causes the vehicle computing device 114 to receive voice commands and/or audible user launch commands for launching an application, such as from the applications logic 144b. As depicted, the vehicle computing device 114 may currently access the stored applications 332, such as navigation software, speech recognition software, satellite radio software, terrestrial ratio software, and weather software. As will be understood, one or more of the stored applications 332 may be stored in the memory component 134 (FIGS. 1, 2) when launched and/or at other times. Additionally, the vehicle computing device 114 may also download available applications 334, such as from an online store. In FIG. 3, the available applications 334 include internet music software, reservation maker software, social media software, videos of the world software, shopping app software, image capture software, and my calendar software. In response to selection of one or more of the available applications 334, a download and/or installation of the selected available applications may be instantiated.

As discussed above, the stored applications 332 may have been installed into the vehicle computing device 114 during manufacturing and thus may be configured for operation using the speech recognition logic 144a. However, because the selected available application is installed after production, the available applications 334 may include a speech recognition component as part of the download. The speech recognition component may include a speech recognition instruction and a stored launch command. The speech recognition instruction may provide instructions to the vehicle computing device 114 regarding a process for translating a voice command into a command discernible by the vehicle computing device 114 (while using the speech recognition logic 144a).

As an example, the image capture application depicted in FIG. 3 may only utilize a small number of commands. The image capture application may provide commands, such as "capture," "focus," "flash," "delete," "save," and a few others. Accordingly, the speech recognition instruction may include this vocabulary (or instructions for downloading this vocabulary) and a command indicating that the speech recognition should be performed locally from this vocabulary.

By contrast, the "videos of the world" application may utilize an extremely large vocabulary of voice commands because the videos may be titled using a near infinite number of different combinations of words. Accordingly, the speech recognition instruction for this application may command the vehicle computing device 114 (using the speech recognition logic 144a) to send data related to a received voice command to the first remote computing device 224. The first remote computing device 224 may translate the voice command and send the translated voice command back to the vehicle computing device 114 for performing a functional action that fulfills the voice command.

Similarly, some embodiments may include a speech recognition instruction that commands the vehicle computing device 114 to determine whether another application is installed and, if so, utilize a vocabulary from that application for speech recognition. Some embodiments may include a speech recognition instruction that utilizes the vocabulary associated with the application that is being used, but in response to a failure to translate a voice command, utilize other local and/or remote vocabularies.

The stored launch command may also be included with a downloaded application. The stored launch command may include data for one or more voice commands that a user may provide that will cause the vehicle computing device 114 to launch the application. As an example, the "my calendar" application may include stored launch commands, such as "launch calendar," "launch my calendar," "launch scheduler," etc. These stored launch commands may be sent to the speech recognition logic 144a and/or made available to the vehicle computing device 114 when executing the speech recognition logic 144a.

Additionally, some embodiments may provide a user option for the user to define custom launch commands. As an example, a user may desire to launch the "my calendar" application with the launch command "Launch Cal." In response, the vehicle computing device 114 may first determine whether the user defined launch command will conflict with other stored launch commands. If not, the user-defined launch command may be stored as a stored launch command. Similarly, upon installation of a new application, the vehicle computing device 114 may determine whether any of the stored launch commands conflict with launch commands of the new application. If so, the conflicting launch commands from the new application may be deleted, the user may be prompted for determining a solution, and/or other action may be performed.

Figure 4:
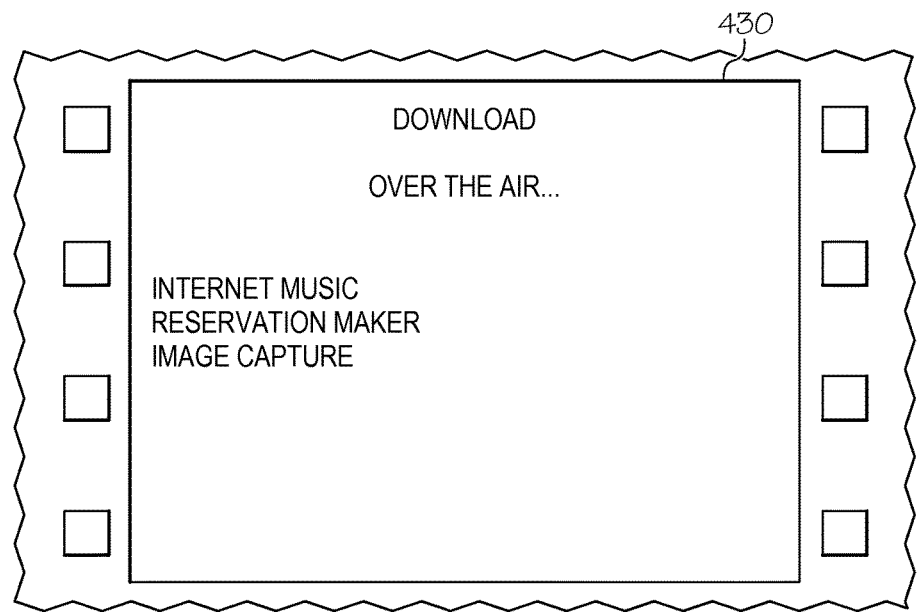
FIG. 4 schematically depicts a user interface that may be provided for acquiring a new application, according to embodiments described herein.

FIG. 4 depicts a user interface 430 that may be provided for acquiring a new application, according to embodiments described herein. In response to selection of one or more of the available applications 334 from FIG. 3, the user interface 430 may be provided for downloading and/or installing the selected applications. As discussed above, the installation process may include determining whether the speech recognition component includes a launch instruction and, in response to determining that the speech recognition component includes the launch instruction, install the launch instruction into the speech recognition logic 144a.

Figure 5:
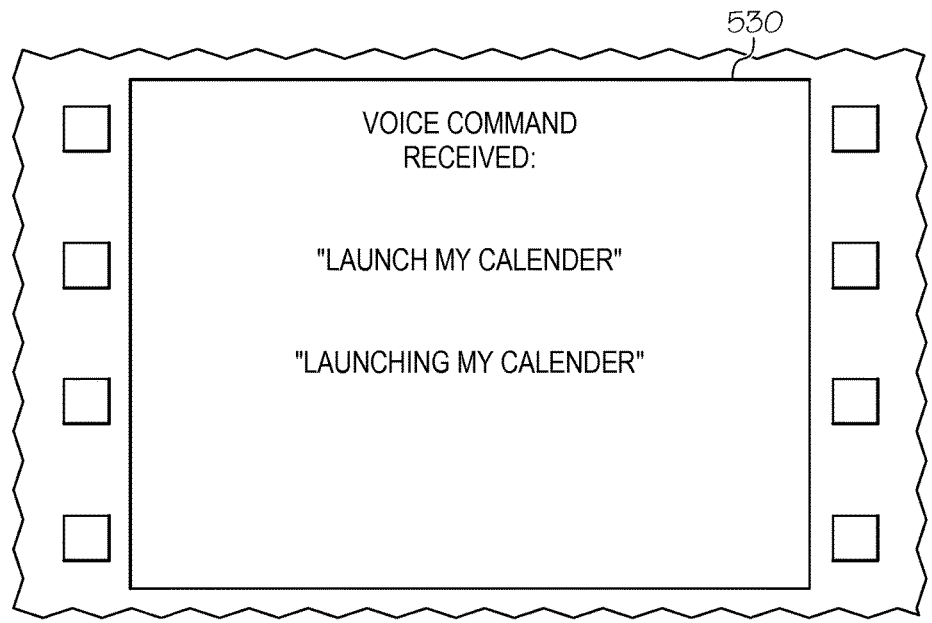
FIG. 5 schematically depicts a user interface that provides information regarding a received audible user launch command, according to embodiments described herein.

FIG. 5 depicts a user interface 530 that provides information regarding a received audible user launch command, according to embodiments described herein. As illustrated, after installation of an application, the user may provide an audible user launch command for launching the application. Then upon receiving the audible user launch command, the vehicle computing device 114 may translate the voice command and/or otherwise determine whether the received command is a launch command. If it is determined that the received command is a launch command, the vehicle computing device 114 may determine to which application the received launch command is directed toward launching. Upon determining the application that the user wishes launched, the vehicle computing device 114 may launch that application.

Figure 6:
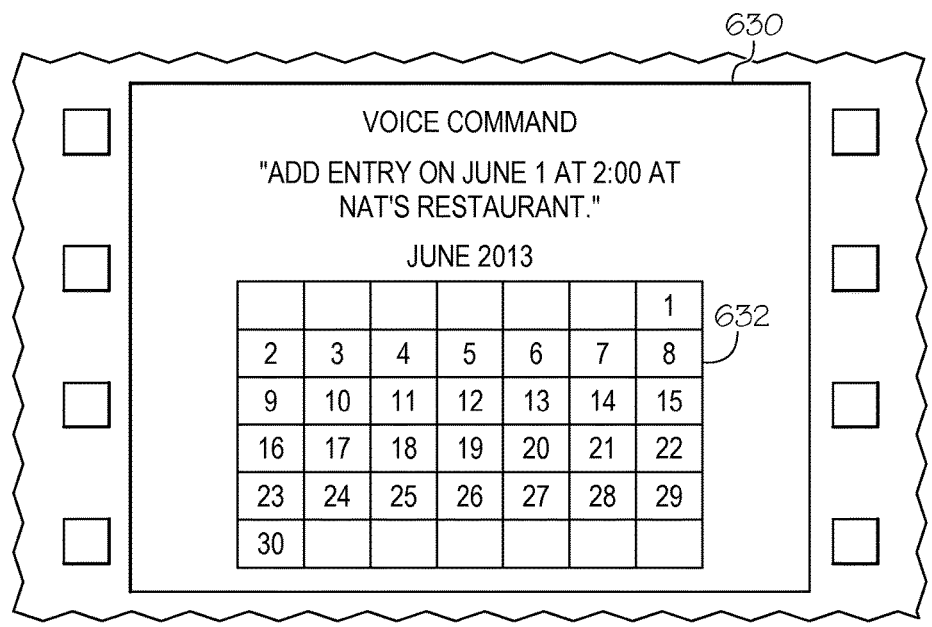
FIG. 6 schematically depicts a user interface that provides information related to a voice command, according to embodiments described herein.

FIG. 6 depicts a user interface 630 that provides information related to a voice command, according to embodiments described herein. As illustrated, after launch of the desired application, the user interface 630 may provide a user calendar 632 and may prepare for receiving a voice command. Based on the speech recognition instruction, voice command may be translated by the vehicle computing device 114 using the speech recognition logic 144a and/or via the first remote computing device 224.

Specifically, some embodiments may be configured to recognize at least two partitions of a voice command, the intent and the criteria of the voice command. As an example, if the user provides the voice command "add entry on June 1 at 2:00 at Nat's Restaurant," the vehicle computing device 114 may recognize the portion "add entry" as the intent (that the user wishes to add a calendar entry). The criteria would be identified as "on June 1 at 2:00 at Nat's Restaurant." While the vehicle computing device 114 may be configured to translate the voice command using a process described above, the calendar application may not recognize an address location and/or other data related to Nat's Restaurant. Accordingly, the vehicle computing device 114 may perform an internet search or other search for Nat's Restaurant via the second remote computing device 226. The information retrieved may be utilized for fulfilling the voice command.

Figure 7:
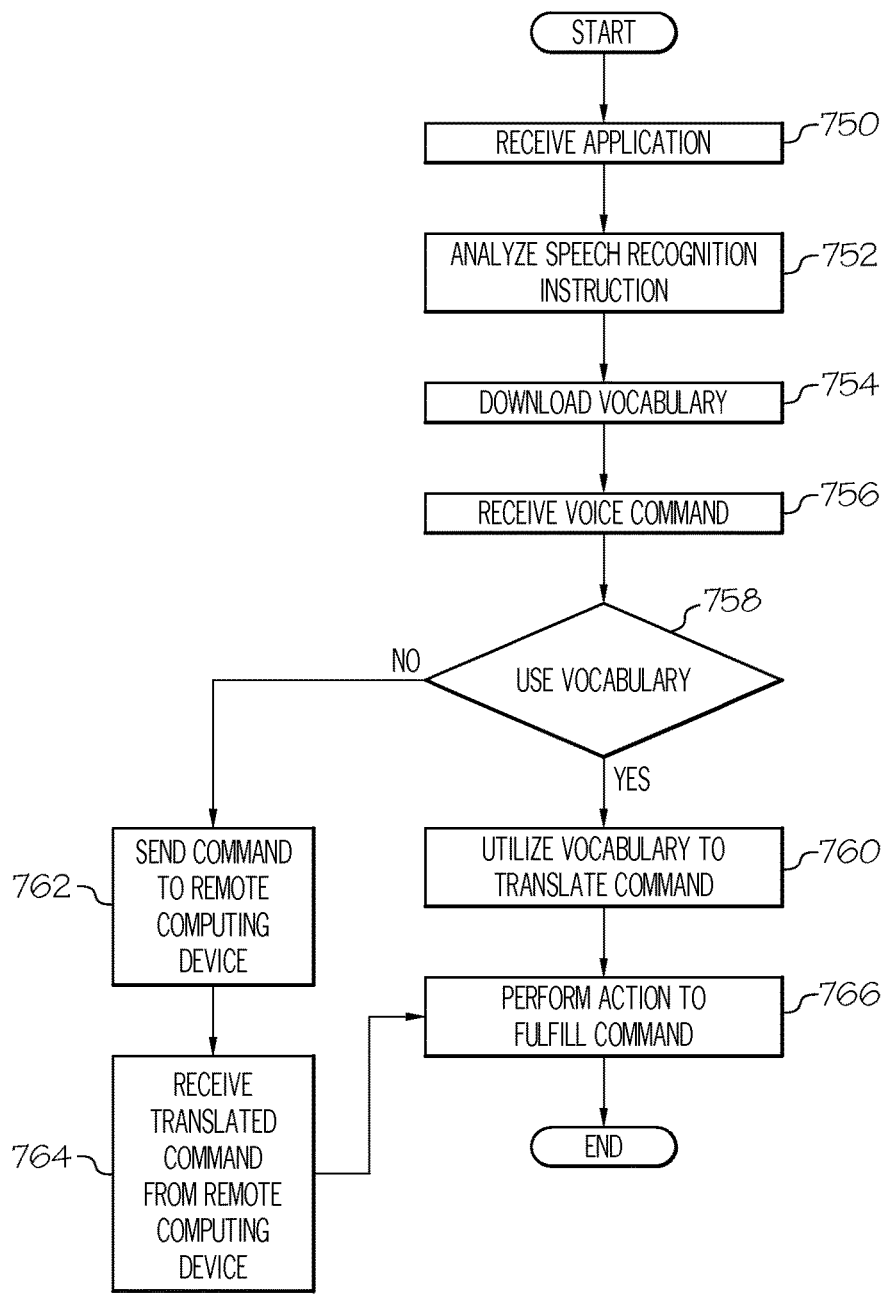
FIG. 7 schematically depicts a flowchart for translating a voice command, according to embodiments described herein.

FIG. 7 depicts a flowchart for translating a voice command, according to embodiments described herein. As illustrated in block 750, an application may be received, where the application includes a speech recognition instruction. The application may be received as an over-the-air download, via a wired connection (e.g., thumb drive, floppy disc, compact disc, DVD, etc.) and/or may be installed into the vehicle computing device 114. In block 752, a speech recognition instruction that is included in the received application may be analyzed to determine a translation action to perform. In block 754, a vocabulary may be downloaded, according to the speech recognition instruction. In block 756, a voice command may be received from a user. In response to receiving the voice command, in block 758, a determination may be made regarding whether to utilize the vocabulary. If so, in block 760, the vocabulary may be utilized to translate the voice command. If at block 758, the vocabulary is not to be used, in block 762, a command may be sent to the first remote computing device 224. In block 764, the translated command may be received from the first remote computing device 224. In block 766, a functional action may be performed to fulfill the voice command.

It should be understood that while in the example of FIG. 7, a decision is made whether to use the included vocabulary to translate a received voice command, this is merely an example. Some embodiments may be configured such that a vocabulary may not be included and thus the received voice command is always sent to the first remote computing device 224 for translation. In some embodiments, the vocabulary is included, so all commands are translated locally. Still some embodiments may include an instruction to download a vocabulary for local use. Other embodiments are also discussed above.

Figure 8:
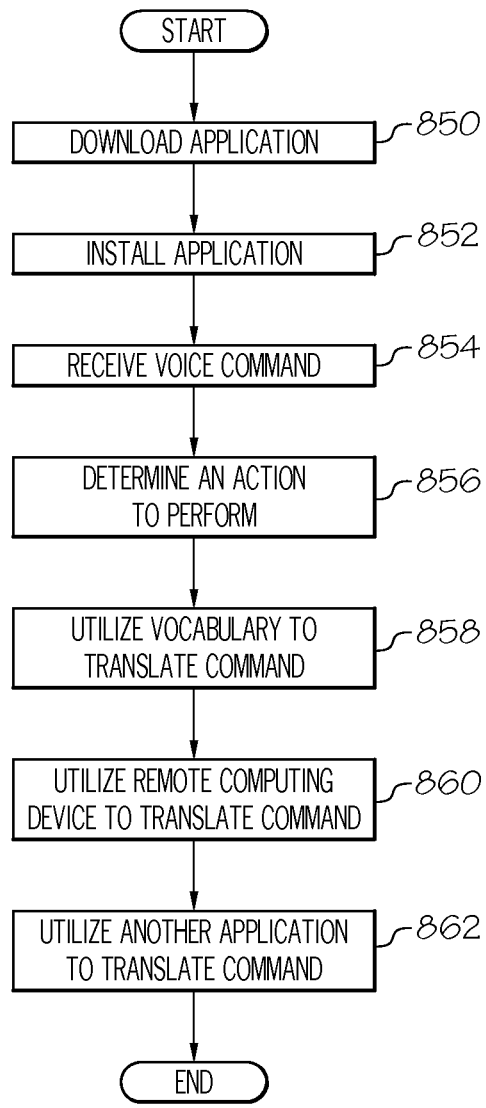
FIG. 8 schematically depicts a flowchart for utilizing a remote computing device to translate a voice command, according to embodiments described herein.

FIG. 8 depicts a flowchart for utilizing a remote computing device to translate a voice command, according to embodiments described herein. As illustrated in block 850, an application may be downloaded, where the application includes a speech recognition component. In block 852, the application may be installed, where installing the application includes determining whether the speech recognition component includes a launch instruction. In response to determining that the speech recognition component includes the launch instruction, the launch instruction may be installed into the speech recognition logic 144a, where the speech recognition component includes a speech recognition instruction. In block 854, a voice command may be received from a user. In block 856, a translation action may be determined for translating the voice command, where the translation action is determined based on the voice command and the speech recognition component. In block 858, in response to determining that the translation action includes utilizing a vocabulary (such as a first vocabulary), the vocabulary may be utilized to translate the voice command and perform a functional action that fulfills the voice command. In block 860, in response to determining that the translation action includes sending the voice command to a remote computing device, the voice command may be sent to the remote computing device, which translates the command. The translated command may be received back from the remote computing device, and a functional action that fulfills the command may be performed. In block 862, in response to determining that the translation action indicates that a vocabulary (such as a second vocabulary) from a different application will be utilized to translate the command, the other application may be loaded and utilized to translate the voice command. A functional action that fulfills the voice command may then be performed.

It should be understood that while embodiments disclosed herein are related to a vehicle computing device 114 and a vehicle speech recognition system, these are merely examples. The embodiments herein may be directed to any speech recognition system, such as those on a mobile device, personal computer, tablet, laptop, etc.

As illustrated above, various embodiments for dynamic download of embedded voice components are disclosed. These embodiments provide the ability to utilize a most efficient mechanism for speech recognition, as well as the ability to utilize speech recognition for newly installed applications. Embodiments described herein may also allow for launching of newly installed applications with predefined launch commands and/or user-defined launch commands. Embodiments also allow for an interactive speech recognition experience for the user, regardless of whether the application was installed during production, or added after production. It should also be understood that these embodiments are merely exemplary and are not intended to limit the scope of this disclosure.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A method for dynamic download of embedded voice components comprising:
    downloading an application, wherein the application comprises a speech recognition component that includes a speech recognition instruction;
    installing the application, wherein installing the application comprises determining whether the speech recognition component includes a launch instruction and, in response to determining that the speech recognition component includes the launch instruction, installing the launch instruction into an embedded speech recognition application;
    receiving a voice command from a user to implement the function;
    identifying an intent and a criteria from the voice command, wherein the intent relates to an action to be taken and wherein the criteria indicates an item to which the action is directed;
    determining whether the speech recognition component comprises a first vocabulary and, in response to determining that the speech recognition component comprises the first vocabulary, determine whether the first vocabulary recognizes the criteria and the intent;
    in response to determining that the criteria is not recognized by the first vocabulary, performing an internet search to determine the criteria;
    in response to determining that the intent is recognized by the first vocabulary, utilizing the first vocabulary to recognize the intent; and
    in response to determining that the intent is not recognized by the first vocabulary, determining whether the speech recognition component indicates that a second vocabulary from a different application will be utilized to recognize the intent, and utilizing the different application to translate the intent.

2. The method of claim 1, further comprising:
    determining whether the speech recognition component indicates that the voice command will be sent to a remote computing device; and
    in response to determining that the speech recognition component indicates that the voice command will be sent to the remote computing device for translation, sending the voice command to the remote computing device, receiving the translated command, and performing the functional action that fulfills the voice command.

3. The method of claim 1, further comprising performing the functional action that fulfills the voice command.

4. The method of claim 1, further comprising:
receiving an audible user launch command from the user;
determining whether the audible user launch command corresponds with a stored launch command for launching the application; and
in response to determining that the audible user launch command corresponds with the stored launch command for launching the application, launching the application.

5. The method of claim 1, wherein the speech recognition component comprises a stored launch command for launching the application via an audible user launch command.

6. The method of claim 5, further comprising:
loading the stored launch command;
receiving the audible user launch command to launch the application;
determining whether the audible user launch command relates to the application; and
launching the application, based on the audible user launch command.

7. The method of claim 5, further comprising providing a user option to define the stored launch command.

8. A system for dynamic download of embedded voice components comprising:
a microphone for receiving a voice command;
a processor for executing logic; and
a memory component that stores logic that, when executed by the processor, causes the processor to perform at least the following:
receive an application via a wireless communication, wherein the application comprises a speech recognition component;
receive, via the microphone, the voice command from a user;
identify a criteria and an intent from the voice command;
analyze the speech recognition component to determine a translation action to perform, based on the voice command;
in response to determining that the translation action includes downloading a vocabulary from a first remote computing device, download the vocabulary from the first remote computing device and utilize the vocabulary to recognize the criteria and the intent;
in response to determining that the vocabulary does not recognize the criteria, perform an internet search to determine the criteria;
in response to determining that the vocabulary does not recognize the intent, send the voice command to the second remote computing device and receive a translated version of the intent.

9. The system of claim 8, wherein the logic further causes the processor to perform a functional action that fulfills the voice command.

10. The system of claim 8, wherein the logic further causes the processor to perform at least the following:
receive an audible user launch command from the user;
determine whether the audible user launch command corresponds with a stored launch command for launching the application; and
in response to determining that the audible user launch command corresponds with the stored launch command for launching the application, launch the application.

11. The system of claim 8, wherein the speech recognition component comprises a stored launch command for launching the application via the voice command.

12. The system of claim 11, wherein the logic further causes the processor to perform at least the following:
load the stored launch command;
receive an audible user launch command to launch the application;
determine whether the audible user launch command relates to the application; and
launch the application, based on the audible user launch command.

13. The system of claim 8, wherein the logic further causes the processor to provide a user option to define a stored launch command.

14. A vehicle speech recognition system for dynamic download of embedded voice components comprising:
a processor; and
a memory component that stores logic that, when executed by the processor, causes the processor to perform at least the following:
install an application, wherein the application comprises a speech recognition component that includes a speech recognition instruction;
receive a voice command from a user;
identify an intent and a criteria from the voice command;
determine whether the speech recognition component comprises a first vocabulary and, in response to determining that the speech recognition component comprises the first vocabulary, utilize the first vocabulary to recognize the criteria and the intent;
in response to determining that the criteria is not recognized by first vocabulary, perform an internet search to determine the criteria; and
determine whether the first vocabulary recognizes the intent and, in response to determining that the first vocabulary does not recognize the intent, send the voice command to the remote computing device, receive the translated intent, and perform the functional action that fulfills the voice command.

15. The vehicle speech recognition system of claim 14, wherein installing the application further comprises determining whether the speech recognition component includes a stored launch command and, in response to determining that the speech recognition component includes the stored launch command, install the stored launch command into an embedded speech recognition application.

16. The vehicle speech recognition system of claim 15, wherein the logic further causes the processor to perform at least the following:
receive an audible user launch command from the user;
determine whether the user launch command corresponds with the stored launch command; and
in response to determining that the audible user launch command corresponds with the stored launch command, launch the application.

17. The vehicle speech recognition system of claim 14, wherein the logic further causes the processor to determine whether the speech recognition component indicates that a second vocabulary from a different application will be utilized to translate the voice command and, in response to determining that the speech recognition component indicates that the second vocabulary from the different application will be utilized, load the different application, utilize the different application to translate the voice command, and perform the functional action that fulfills the voice command.

18. The vehicle speech recognition system of claim 14, wherein the logic further causes the processor to provide a user option to define a stored launch command.

* * * * *